US007427438B2

(12) United States Patent
Jones et al.

(10) Patent No.: US 7,427,438 B2
(45) Date of Patent: *Sep. 23, 2008

(54) POLYMERIZABLE OLIGOMERIC URETHANE COMPOSITIONS COMPRISING NANOPARTICLES

(75) Inventors: Clinton L. Jones, Somerset, WI (US); Brant U. Kolb, Afton, MN (US); David B. Olson, Marine on St. Croix, MN (US); Emily S. Goenner, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/950,798

(22) Filed: Dec. 5, 2007

(65) Prior Publication Data
US 2008/0075925 A1    Mar. 27, 2008

Related U.S. Application Data

(63) Continuation of application No. 11/276,691, filed on Mar. 10, 2006, now Pat. No. 7,326,448, which is a continuation-in-part of application No. PCT/US2006/005280, filed on Feb. 15, 2006.

(60) Provisional application No. 60/653,784, filed on Feb. 17, 2005, provisional application No. 60/660,962, filed on Mar. 11, 2005.

(51) Int. Cl.
*B32B 5/16* (2006.01)
*B32B 27/16* (2006.01)
*B32B 27/18* (2006.01)
*B32B 27/30* (2006.01)
*B32B 27/40* (2006.01)

(52) U.S. Cl. ............... 428/331; 428/1.1; 428/1.52; 428/1.55; 428/423.1; 428/500; 428/913; 977/778; 977/932

(58) Field of Classification Search ............... 428/1.1, 428/1.3, 1.52, 1.55, 167, 331, 424.2, 425.2, 428/423.1, 500, 913; 977/778, 932
See application file for complete search history.

(56) References Cited

U.S. PATENT DOCUMENTS

| 4,487,904 A | 12/1984 | Fukuda et al. |
| 4,542,449 A | 9/1985 | Whitehead |
| 4,568,445 A | 2/1986 | Cates |
| 4,721,377 A | 1/1988 | Fukuda et al. |
| 4,812,032 A | 3/1989 | Fukuda et al. |
| 4,931,523 A | 6/1990 | Watanabe et al. |
| 4,937,172 A | 6/1990 | Gervay |
| 4,962,163 A | 10/1990 | Hefner, Jr. et al. |
| 4,970,135 A | 11/1990 | Kushi et al. |
| 5,066,750 A | 11/1991 | Hefner, Jr. et al. |
| 5,073,462 A | 12/1991 | Gervay |
| 5,149,776 A | 9/1992 | Kushi et al. |
| 5,164,464 A | 11/1992 | Hefner, Jr. et al. |
| 5,175,030 A | 12/1992 | Shih-Lai |
| 5,183,597 A | 2/1993 | Lu |
| 5,183,870 A | 2/1993 | Fukushima et al. |
| 5,247,038 A | 9/1993 | Fukushima et al. |
| 5,354,821 A | 10/1994 | Huver et al. |
| 5,424,339 A | 6/1995 | Zanka et al. |
| 5,486,949 A | 1/1996 | Schrenk et al. |
| 5,612,820 A | 3/1997 | Schrenk et al. |
| 5,626,800 A | 5/1997 | Williams et al. |
| 5,635,278 A | 6/1997 | Williams |
| 5,665,494 A | 9/1997 | Kawabata et al. |
| 5,691,846 A | 11/1997 | Benson, Jr. et al. |
| 5,714,218 A | 2/1998 | Nishio et al. |
| 5,760,126 A | 6/1998 | Engle et al. |
| 5,771,328 A | 6/1998 | Wortman et al. |
| 5,783,120 A | 7/1998 | Ouderkirk et al. |
| 5,825,543 A | 10/1998 | Ouderkirk et al. |
| 5,828,488 A | 10/1998 | Ouderkirk et al. |
| 5,855,983 A | 1/1999 | Williams |
| 5,882,774 A | 3/1999 | Jonza et al. |
| 5,898,523 A | 4/1999 | Smith et al. |
| 5,900,287 A | 5/1999 | Williams |
| 5,908,874 A | 6/1999 | Fong et al. |
| 5,917,664 A | 6/1999 | O'Neil et al. |
| 5,919,551 A | 7/1999 | Cobb, Jr. et al. |
| 5,932,626 A | 8/1999 | Fong et al. |
| 5,948,514 A | 9/1999 | Komori et al. |
| 6,107,364 A | 8/2000 | Fong et al. |
| 6,111,696 A | 8/2000 | Allen et al. |
| 6,218,074 B1 | 4/2001 | Dueber et al. |
| 6,261,700 B1 | 7/2001 | Olson et al. |
| 6,280,063 B1 | 8/2001 | Fong et al. |
| 6,291,070 B1 | 9/2001 | Arpac et al. |
| 6,329,058 B1 | 12/2001 | Arney et al. |

(Continued)

FOREIGN PATENT DOCUMENTS

| EP | 0 089 041 | 11/1987 |
| EP | 0 768 351 | 4/1997 |
| EP | 1 014 113 | 6/2000 |
| EP | 1 388 581 | 2/2004 |
| EP | 1 510 557 | 3/2005 |
| JP | 11-223703 | 8/1999 |
| JP | 2003-342338 | 12/2003 |
| JP | 2005-316219 | 11/2005 |
| WO | WO 96/19347 | 6/1996 |
| WO | WO 98/50340 | 11/1998 |

(Continued)

*Primary Examiner*—Shean C Wu
(74) *Attorney, Agent, or Firm*—Carolyn A. Fischer

(57) ABSTRACT

Presently described are microstructured articles such as a brightness enhancing film or optical turning film. The microstructured articles comprise a brightness enhancing polymerized structure comprising the reaction product of a composition comprising an organic component having at least one oligomeric urethane (meth)acrylate and surface modified silica nanoparticles.

18 Claims, 6 Drawing Sheets

U.S. PATENT DOCUMENTS

| | | |
|---|---|---|
| 6,355,754 B1 | 3/2002 | Olson et al. |
| 6,356,391 B1 | 3/2002 | Gardiner et al. |
| 6,359,170 B1 | 3/2002 | Olson |
| 6,368,682 B1 | 4/2002 | Fong |
| 6,376,590 B2 | 4/2002 | Kolb et al. |
| 6,432,526 B1 | 8/2002 | Arney et al. |
| 6,521,677 B2 | 2/2003 | Yashiro et al. |
| 6,541,591 B2 | 4/2003 | Olson et al. |
| 6,593,392 B2 | 7/2003 | Wang |
| 6,599,631 B2 | 7/2003 | Kambe et al. |
| 6,645,569 B2 | 11/2003 | Cramer et al. |
| 6,656,990 B2 | 12/2003 | Shustack et al. |
| 6,727,309 B1 | 4/2004 | Paiva et al. |
| 6,844,047 B2 | 1/2005 | Kaminsky et al. |
| 6,844,950 B2 | 1/2005 | Ja Chisholm et al. |
| 6,846,089 B2 | 1/2005 | Stevenson et al. |
| 6,998,425 B2 | 2/2006 | Chisholm et al. |
| 7,046,439 B2 | 5/2006 | Kaminsky et al. |
| 7,074,463 B2 | 7/2006 | Jones et al. |
| 7,179,513 B2 | 2/2007 | Jones et al. |
| 7,326,448 B2 | 2/2008 | Jones et al. |
| 2002/0057497 A1 | 5/2002 | Gardiner et al. |
| 2003/0021566 A1 | 1/2003 | Shustack et al. |
| 2003/0050358 A1 | 3/2003 | Wang |
| 2003/0100693 A1 | 5/2003 | Olson et al. |
| 2003/0129385 A1 | 7/2003 | Hojo et al. |
| 2003/0165680 A1 | 9/2003 | Brady et al. |
| 2003/0175004 A1 | 9/2003 | Garito et al. |
| 2003/0180029 A1 | 9/2003 | Garito et al. |
| 2004/0132858 A1 | 7/2004 | Chisholm et al. |
| 2004/0229059 A1 | 11/2004 | Kausch |
| 2004/0233526 A1 | 11/2004 | Kaminsky et al. |
| 2005/0049325 A1 | 3/2005 | Chisholm et al. |
| 2005/0059766 A1 | 3/2005 | Jones et al. |
| 2005/0063898 A1 | 3/2005 | Ja Chisholm |
| 2005/0136252 A1 | 6/2005 | Chisholm et al. |
| 2005/0151119 A1 | 7/2005 | Jones et al. |
| 2007/0138691 A1 | 6/2007 | Sugimoto |

FOREIGN PATENT DOCUMENTS

| | | |
|---|---|---|
| WO | WO 98/50441 | 11/1998 |
| WO | WO 98/50442 | 11/1998 |
| WO | WO 98/50805 | 11/1998 |
| WO | WO 98/50806 | 11/1998 |
| WO | WO 00/06495 | 2/2000 |
| WO | WO 00/14050 | 3/2000 |
| WO | WO 01/29138 | 4/2001 |
| WO | WO 01/51539 | 7/2001 |
| WO | WO 00/00594 | 1/2002 |
| WO | WO 02/45129 | 6/2002 |
| WO | WO 02/051892 | 7/2002 |
| WO | WO 03/033558 | 4/2003 |
| WO | WO 03/041875 | 5/2003 |
| WO | WO 03/076528 | 9/2003 |
| WO | WO 2004/042434 | 5/2004 |
| WO | WO 2004/108839 | 12/2004 |

POLYMERIZABLE OLIGOMERIC URETHANE COMPOSITIONS COMPRISING NANOPARTICLES

RELATED APPLICATION DATA

This application is a continuation of U.S. Ser. No. 11/276,691, filed Mar. 10, 2006 now U.S. Pat. No. 7,326,448, now allowed which is a continuation-in-part of pending PCT Application No. PCT/US2006/005280, filed Feb. 15, 2006, which claims priority to U.S. Provisional Application Ser. No. 60/653,784, filed Feb. 17, 2005; and this application claims the benefit of U.S. Provisional Application Ser. No. 60/660,962, filed Mar. 11, 2005.

BACKGROUND

Certain microreplicated optical products, such as described in U.S. Pat. Nos. 5,175,030 and 5,183,597, are commonly referred to as a "brightness enhancing films". Brightness enhancing films are utilized in many electronic products to increase the brightness of a backlit flat panel display such as a liquid crystal display (LCD) including those used in electroluminescent panels, laptop computer displays, word processors, desktop monitors, televisions, video cameras, as well as automotive and aviation displays.

Brightness enhancing films desirably exhibit specific optical and physical properties including the index of refraction of a brightness enhancing film that is related to the brightness gain (i.e. "gain") produced. Improved brightness can allow the electronic product to operate more efficiently by using less power to light the display, thereby reducing the power consumption, placing a lower heat load on its components, and extending the lifetime of the product.

Brightness enhancing films have been prepared from high index of refraction monomers that are cured or polymerized, as described for example in U.S. Pat. Nos. 5,908,874; 5,932,626; 6,107,364; 6,280,063; 6,355,754; as well as EP 1 014113 and WO 03/076528.

Although various polymerizable compositions that are suitable for the manufacture of brightness enhancing films are known, industry would find advantage in alternative compositions.

SUMMARY OF THE INVENTION

Presently described are microstructured articles such as a brightness enhancing film or optical turning film. The microstructured articles comprise a brightness enhancing polymerized structure comprising the reaction product of a composition comprising an organic component having at least one oligomeric urethane (meth)acrylate and surface modified silica nanoparticles.

BRIEF DESCRIPTION OF THE DRAWINGS

The invention may be more completely understood in consideration of the following detailed description of various embodiments of the invention in connection with the accompanying drawings, in which.

Figure 1:
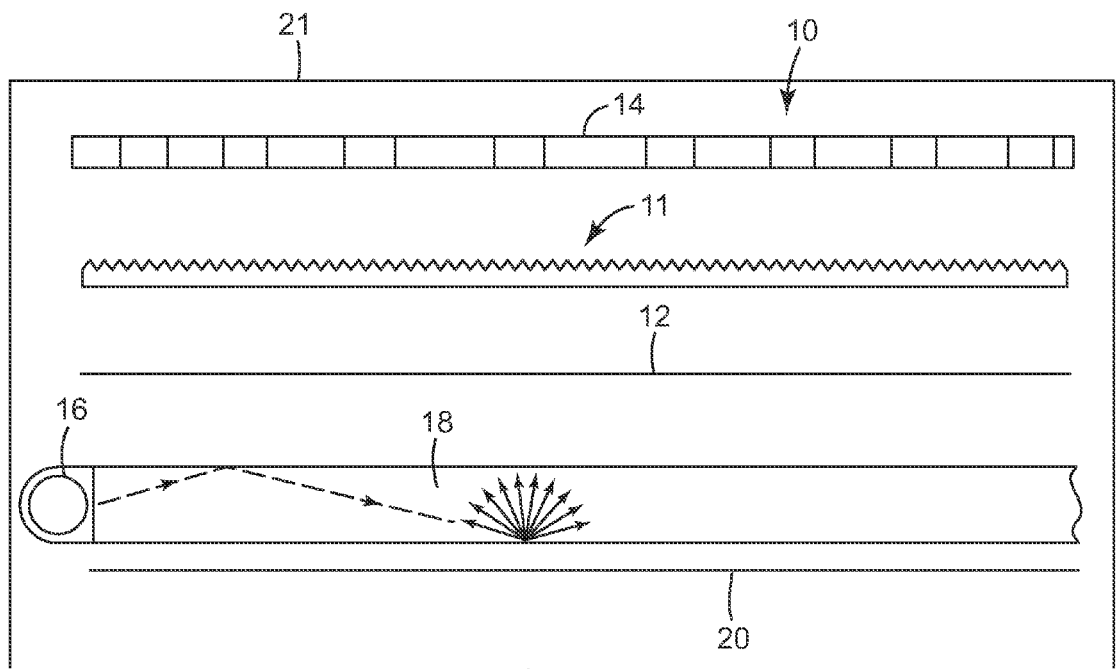
FIG. 1 is a schematic view of an illustrative micro-structured article of the present invention in a backlit liquid crystal display.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The term "microstructure" is used herein as defined and explained in U.S. Pat. No. 4,576,850, the disclosure of which is incorporated by reference herein. Thus, it means the configuration of a surface that depicts or characterizes the predetermined desired utilitarian purpose or function of the article having the microstructure. Discontinuities such as projections and indentations in the surface of said article will deviate in profile from the average center line drawn through the microstructure such that the sum of the areas embraced by the surface profile above the center line is equal to the sum of the areas below the line, said line being essentially parallel to the nominal surface (bearing the microstructure) of the article. The heights of said deviations will typically be about +/−0.005 to +/−750 microns, as measured by an optical or electron microscope, through a representative characteristic length of the surface, e.g., 1-30 cm. Said average center line can be piano, concave, convex, aspheric or combinations thereof. Articles where said deviations are of low order, e.g., from +/−0.005+/−0.1 or, preferably, +/−0.05 microns, and said deviations are of infrequent or minimal occurrence, i.e., the surface is free of any significant discontinuities, are those where the microstructure-bearing surface is an essentially "flat" or "smooth" surface, such articles being useful, for example, as precision optical elements or elements with a precision optical interface, such as ophthalmic lenses. Articles where said deviations are of low order and of frequent occurrence include those having anti-reflective microstructure. Articles where said deviations are of high-order, e.g., from +/−0.1 to +/−750 microns, and attributable to microstructure comprising a plurality of utilitarian discontinuities which are the same or different and spaced apart or contiguous in a random or ordered manner, are articles such as retroreflective cube-corner sheeting, linear Fresnel lenses, video discs and brightness enhancing films. The microstructure-bearing surface can contain utilitarian discontinuities of both said low and high orders. The microstructure-bearing surface may contain extraneous or non-utilitarian discontinuities so long as the amounts or types thereof do not significantly interfere with or adversely affect the predetermined desired utilities of said articles.

Brightness enhancing films generally enhance on-axis luminance (referred herein as "brightness") of a lighting device. Brightness enhancing films can be light transmissible, microstructured films. The microstructured topography can be a plurality of prisms on the film surface such that the films can be used to redirect light through reflection and refraction. The heights of the prisms typically range from about 1 to 75 microns. When used in an optical display such as that found in laptop computers, watches, etc., the microstructured optical film can increase brightness of an optical display by limiting light escaping from the display to within a pair of planes disposed at desired angles from a normal axis running through the optical display. As a result, light that would exit the display outside of the allowable range is reflected back into the display where a portion of it can be "recycled" and returned back to the microstructured film at an angle that allows it to escape from the display. The recycling is useful because it can reduce power consumption needed to provide a display with a desired level of brightness.

Retro-reflective films generally are capable of returning a significant percentage of incident light at relatively high entrance angles regardless of the rotational orientation of the sheeting about an axis perpendicular to its major surface. Cube corner retro-reflective film can include a body portion typically having a substantially planar base surface and a structured surface comprising a plurality of cube corner elements opposite the base surface. Each cube corner element can include three mutually substantially perpendicular optical faces that typically intersect at a single reference point, or apex. The base of the cube corner element acts as an aperture through which light is transmitted into the cube corner element. In use, light incident on the base surface of the sheeting is refracted at the base surface of the sheeting, transmitted through the respective bases of the cube corner elements disposed on the sheeting, reflected from each of the three perpendicular cube corner optical faces, and redirected toward the light source, as described in U.S. Pat. No. 5,898,523, which is incorporated by reference herein.

For the following defined terms, these definitions shall be applied, unless a different definition is given in the claims or elsewhere in this specification.

The term "polymer" will be understood to include polymers, copolymers (e.g., polymers formed using two or more different monomers), oligomers and combinations thereof, as well as polymers, oligomers, or copolymers that can be formed in a miscible blend by, for example, coextrusion or reaction, including transesterification. Both block and random copolymers are included, unless indicated otherwise.

The term "refractive index" is defined herein as the absolute refractive index of a material that is understood to be the ratio of the speed of electromagnetic radiation in free space to the speed of the radiation in that material. The refractive index can be measured using known methods and is generally measured using an Abbe Refractometer in the visible light region.

The term "nanoparticles" is defined herein to mean particles (primary particles or associated primary particles) with a diameter less than about 100 nm.

The term "associated particles" as used herein refers to a grouping of two or more primary particles that are aggregated and/or agglomerated.

The term "aggregation" as used herein is descriptive of a strong association between primary particles that may be chemically bound to one another. The breakdown of aggregates into smaller particles is difficult to achieve.

The term "agglomeration" as used herein is descriptive of a weak association of primary particles that may be held together by charge or polarity and can be broken down into smaller entities.

The term "primary particle size" is defined herein as the size of a non-associated single particle.

The term "sol" is defined herein as a dispersion or suspension of colloidal particles in a liquid phase.

The term "stable dispersion" is defined herein as a dispersion in which the colloidal nanoparticles do not agglomerate after standing for a period of time, such as about 24 hours, under ambient conditions—e.g. room temperature (about 20-22° C.), atmospheric pressure, and no extreme electromagnetic forces.

The term "gain" is defined herein as a measure of the improvement in brightness of a display due to a brightness enhancing film, and is a property of the optical material, and also of the geometry of the brightness enhancing film. Typically, the viewing angle decreases as the gain increases. A high gain is desired for a brightness enhancing film because improved gain provides an effective increase in the brightness of the backlight display.

The recitation of numerical ranges by endpoints includes all numbers subsumed within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. Thus, for example, reference to a composition containing "a compound" includes a mixture of two or more compounds. As used in this specification and the appended claims, the term "or" is generally employed in its sense including "and/or" unless the content clearly dictates otherwise.

Unless otherwise indicated, all numbers expressing quantities of ingredients, measurement of properties and so forth used in the specification and claims are to be understood as being modified in all instances by the term "about."

Presently described are microstructured articles wherein the microstructured surface layer is formed from the reaction product of a polymerizable composition comprising an organic component having at least one oligomeric urethane (also known as a (meth)acrylated urethane oligomers) and silica nanoparticles. The polymerizable composition is preferably a substantially solvent-free radiation curable inorganic filled organic composite. The organic component can be a solid or comprise a solid component provided that the melting point is less than the coating temperature. The organic component can be a liquid at ambient temperature. The organic component typically has a refractive index of at least 1.47 for most product applications; whereas the organic component of a turning film may have a refractive index as low as 1.44. High transmittance in the visible light spectrum is also typically preferred. The inclusion of the silica particles can improve the durability. Durable articles can include a polymerized structure having a plurality of surface modified colloidal nanoparticles. The durable article can be an optical element or optical product constructed of a base layer and an optical layer. The base layer and optical layer can be formed from the same or different polymer material. The polymerized structure having a plurality of surface modified colloidal nanoparticles has the advantage that it can be formed in a solvent-less system.

Preferably, the durable optical film includes a polymerized optical film structure having a microstructured surface and a scratch contrast ratio value in a range of 1.0 to 1.15, or 1.0 to 1.12, or 1.0 to 1.10, or 1.0 to 1.05 as determined according to the test method described in U.S. Pat. No. 7,289,202; incorporated herein by reference. In the case of rounded prism apexes, e.g. having a radius ranging from about 0.5 to 15 micrometers, the scratch contrast ratio value can range from 1.0 to 1.65, or 1.0 to 1.4, or 1.0 to 1.10.

The cured articles preferably exhibit a haze rating corresponding to a value no greater than 5%, as determined by ASTM procedure D1003 on a flat film 3.2 mm thick on a bisphenol A polycarbonate substrate. Other preferred properties are an abrasion rating no greater than 20, preferably no greater than 10, as determined by the falling sand abrasion test (ASTM procedure D968), and an adhesion rating to bisphenol A polycarbonate of 5B as determined by the crosshatch adhesion test (ASTM procedure D3359).

The organic phase and/or polymerizable resin is preferably sufficiently crosslinked to provide a glass transition temperature (Tg) of at least 35° C. after curing, preferably at least 40° C., and more preferably at least 45° C. The glass transition temperature can be measured by methods known in the art, such as Differential Scanning Calorimetry (DSC), modulated DSC, or Dynamic Mechanical Analysis. The polymerizable composition can be polymerized by conventional free radical polymerization methods.

Figure 2:
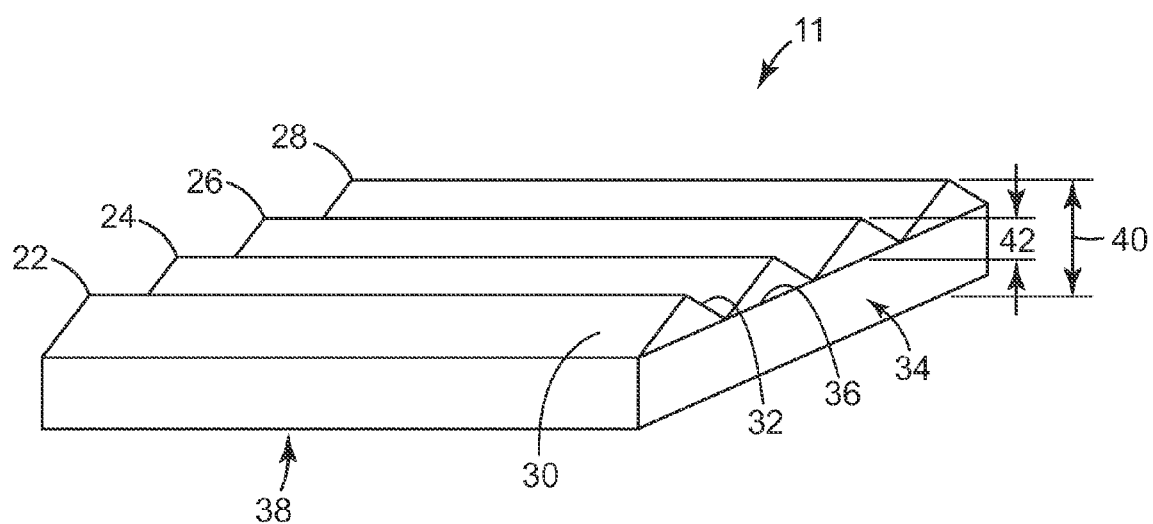
FIG. 2 is a perspective view of an illustrative polymerized structure bearing a micro-structured surface.

Other properties of the cured composition include a tensile strength in the range of about 70-700 kg/cm$^2$, a modulus of elasticity in the range of about 140-14,000 kg/cm$^2$; an elongation to break in the range of about 5-300%, an optical homogeneity of at least about 91% transmission, a haze value of less than about 5%, a birefringence of less than about 0.002 and/or a dynamic tensile modulus, E', that falls within the boundary of the area A-B-C-D in FIG. 2 of U.S. Pat. No. 6,833,176. The dynamic tensile modulus typically ranges from about $4 \times 10^7$ Pa to about $1 \times 10^9$ Pa at about 20° C. Further, the dynamic tensile modulus typically ranges from about $3 \times 10^6$ Pa to about $5 \times 10^8$ Pa at about 60° C. Further, the dynamic tensile modulus typically ranges from about $1 \times 10^6$ Pa to about $1 \times 10^8$ Pa at about 100° C.

The articles described herein are formed from the reaction product of a polymerizable composition comprising at least one oligomeric urethane (meth)acrylate. Typically the oligomeric urethane (meth)acrylate is a multi(meth)acrylate. The term "(meth)acrylate" is used to designate esters of acrylic and methacrylic acids, and "multi(meth)acrylate" designates a molecule containing more than one (meth)acrylic group, as opposed to "poly(meth)acrylate" which commonly designates (meth)acrylate polymers. Most often, the multi(meth) acrylate is a di(meth)acrylate, but it is also contemplated to employ tri(meth)acrylates, tetra(meth)acrylates and so on.

Oligomeric urethane multi(meth)acrylates may be obtained commercially; e.g., from Sartomer under the trade designation "Photomer 6000 Series", such as "Photomer 6010" and "Photomer 6020", and also under the trade designation "CN 900 Series", such as "CN966B85", "CN964" and "CN972". Oligomeric urethane (meth)acrylates are also available from Surface Specialties, such as available under the trade designations "Ebecryl 8402", "Ebecryl 8807" and "Ebecryl 4827". Oligomeric urethane (meth)acrylates may also be prepared by the initial reaction of an alkylene or aromatic diisocyanate of the formula OCN—R$^3$—NCO with a polyol. Most often, the polyol is a diol of the formula HO—R$^4$—OH, wherein R$^3$ is a C$_{2-100}$ alkylene or an arylene group and R$^4$ is a C$_{2-100}$ alkylene group. The intermediate product is then a urethane diol diisocyanate, which subsequently can undergo reaction with a hydroxyalkyl (meth) acrylate. Suitable diisocyanates include 2,2,4-trimethylhexylene diisocyanate and toluene diisocyanate; alkylene diisocyanates are generally preferred. A particularly preferred compound of this type may be prepared from 2,2,4-trimethylhexylene diisocyanate, poly(caprolactone)diol and 2-hydroxyethyl methacrylate. In at least some embodiments, the urethane (meth)acrylate is preferably aliphatic.

The radiation curable compositions forming the articles of the invention may also comprise at least one other monomer (i.e. other than an oligomeric urethane (meth)acrylate). The other monomer may reduce viscosity and/or improve thermomechanical properties and/or increase refractive index. Monomers having these properties include acrylic monomers (i.e., acrylate and methacrylate esters, acrylamides and methacrylamides), styrenic monomers and ethylenically unsaturated nitrogen heterocycles.

Suitable acrylic monomers include monomeric (meth) acrylate esters. They include alkyl (meth)acrylates such as methyl acrylate, ethyl acrylate, 1-propyl acrylate, methyl methacrylate and t-butyl acrylate.

Also included are (meth)acrylate esters having other functionality. Compounds of this type are illustrated by the 2-(N-butylcarbamyl)ethyl(meth)acrylates, 2,4-dichlorophenyl acrylate, 2,4,6-tribromophenyl acrylate, tribromophenoxylethyl acrylate, t-butylphenyl acrylate, phenyl acrylate, phenyl thioacrylate, phenylthioethyl acrylate, alkoxylated phenyl acrylate, isobornyl acrylate and phenoxyethyl acrylate. The reaction product of tetrabromobisphenol A diepoxide and (meth)acrylic acid is also suitable.

The other monomer may also be a monomeric N-substituted or N,N-disubstituted (meth)acrylamide, especially an acrylamide. These include N-alkylacrylamides and N,N-dialkylacrylamides, especially those containing C$_{1-4}$ alkyl groups. Examples are N-isopropylacrylamide, N-t-butylacrylamide, N,N-dimethylacrylamide and N,N-diethylacrylamide.

The other monomer may further be a polyol multi(meth) acrylate. Such compounds are typically prepared from aliphatic diols, triols and/or tetraols containing 2-10 carbon atoms. Examples of suitable poly(meth)acrylates are ethylene glycol diacrylate, 1,6-hexanediol diacrylate, 2-ethyl-2-hydroxymethyl-1,3-propanediol triacrylate(trimethylolpropane triacrylate), di(trimethylolpropane)tetraacrylate, pentaerythritol tetraacrylate, the corresponding methacrylates and the (meth)acrylates of alkoxylated (usually ethoxylated) derivatives of said polyols. Monomers having two or more (ethylenically unsaturated groups can serve as a crosslinker.

Styrenic compounds suitable for use as the other monomer include styrene, dichlorostyrene, 2,4,6-trichlorostyrene, 2,4,6-tribromostyrene, 4-methylstyrene and 4-phenoxystyrene. Ethylenically unsaturated nitrogen heterocycles include N-vinylpyrrolidone and vinylpyridine.

Constituent proportions in the radiation curable articles of the invention can vary. In general, the organic component can comprise about 30-100% oligomeric urethane multi(meth) acrylate, with any balance being the other (meth)acrylate monomer ethylenically unsaturated groups.

The polymerizable composition contains silica particles. The size of the silica particles is generally chosen to avoid significant visible light scattering. The surface modified silica nanoparticles have a particle size or associated particle size of greater than 1 nm and less than 100 nm, as measured with transmission electron miscroscopy (TEM). The surface modified (e.g. colloidal) silica nanoparticles are preferably substantially fully condensed.

Fully condensed nanoparticles, such as the collidal silica used herein, typically have substantially no hydroxyls in their interiors.

Non-silica containing fully condensed nanoparticles typically have a degree of crystallinity (measured as isolated metal oxide particles) greater than 55%, preferably greater than 60%, and more preferably greater than 70%. For example, the degree of crystallinity can range up to about 86%. The degree of crystallinity can be determined by X-ray defraction techniques. Condensed crystalline (e.g. zirconia) nanoparticles have a high refractive index whereas amorphous nanoparticles typically have a lower refractive index.

Silica nanoparticles can have a particle size from 5 to 75 nm or 10 to 30 nm. Silica nanoparticles are typically in an amount from 10 to 60 wt-%. Typically the amount of silica is less than 40 wt-%.

Suitable silicas are commercially available from Nalco Chemical Co. (Naperville, Ill.) under the trade designation NALCO COLLOIDAL SILICAS. For example, silicas include NALCO trade designations 1040, 1042, 1050, 1060, 2327 and 2329. Suitable fumed silicas include for example, products sold under the tradename, AEROSIL series OX-50, -130, -150, and -200 available from DeGussa AG, (Hanau, Germany), and CAB-O-SPERSE 2095, CAB-O-SPERSE A105, CAB-O-SIL M5 available from Cabot Corp. (Tuscola, Ill.).

The polymerizable compositions may consist of silica(s) as the sole inorganic nanoparticles. Alternatively, silica may be used in combination with other inorganic oxide particles including but not limited to zirconia, titania, antimony oxides, alumina, tin oxides, and/or mixed metal oxide nanoparticles. These optional (non-silica) inorganic oxide particles have a particles size or associated particle size from 5 to 50 nm, or 5 to 15 nm, or 10 nm. These optional (non-silica) inorganic oxide nanoparticles can be present in an amount from 10 to 70 wt-%, or 30 to 50 wt-%. A suitable mixed metal oxide is commercially available from Catalysts & Chemical Industries Corp., (Kawasaki, Japan) under the product designation Optolake 3. A suitable zirconia is commercially available from Nalco Chemical Co. (Naperville, Ill.) under the product designation NALCO OOSSOO8.

Surface-treating the nano-sized particles can provide a stable dispersion in the polymeric resin. Preferably, the surface-treatment stabilizes the nanoparticles so that the particles will be well dispersed in the polymerizable resin and result in a substantially homogeneous composition. Furthermore, the nanoparticles can be modified over at least a portion of its surface with a surface treatment agent so that the stabilized particle can copolymerize or react with the polymerizable resin during curing.

The nanoparticles are preferably treated with a surface treatment agent. In general. a surface treatment agent has a first end that will attach to the particle surface (covalently, ionically or through strong physisorption) and a second end that imparts compatibility of the particle with the resin and/or reacts with resin during curing. Examples of surface treatment agents include alcohols, amines, carboxylic acids, sulfonic acids, phosphohonic acids, silanes and titanates. The preferred type of treatment agent is determined, in part, by the chemical nature of the metal oxide surface. Silanes are preferred for silica and other for siliceous fillers. Silanes and carboxylic acids are preferred for metal oxides such as zirconia. The surface modification can be done either subsequent to mixing with the monomers or after mixing. It is preferred in the case of silanes to react the silanes with the particle or nanoparticle surface before incorporation into the resin. The required amount of surface modifier is dependant upon several factors such particle size, particle type, modifier molecular wt, and modifier type. In general it is preferred that approximately a monolayer of modifier is attached to the surface of the particle. The attachment procedure or reaction conditions required also depend on the surface modifier used. For silanes it is preferred to surface treat at elevated temperatures under acidic or basic conditions for from 1-24 hr approximately. Surface treatment agents such as carboxylic acids may not require elevated temperatures or extended time.

Representative embodiments of surface treatment agents suitable for the durable compositions include compounds such as, for example, isooctyl trimethoxy-silane, N-(3-triethoxysilylpropyl)methoxyethoxyethoxyethyl carbamate (PEG3TES), N-(3-triethoxysilylpropyl)methoxyethoxyethoxyethyl carbamate (PEG2TES), 3-(methacryloyloxy)propyltrimethoxysilane, 3-acryloxypropyltrimethoxysilane, 3-(methacryloyloxy)propyltriethoxysilane, 3-(methacryloyloxy)propylmethyldimethoxysilane, 3-(acryloyloxypropyl)methyldimethoxysilane, 3-(methacryloyloxy)propyldimethylethoxysilane, 3-(methacryloyloxy)propyldimethylethoxysilane, vinyldimethylethoxysilane, phenyltrimethoxysilane, n-octyltrimethoxysilane, dodecyltrimethoxysilane, octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris(2-methoxyethoxy)silane, styrylethyltrimethoxysilane, mercaptopropyltrimethoxysilane, 3-glycidoxypropyltrimethoxysilane, acrylic acid, methacrylic acid, oleic acid, stearic acid, dodecanoic acid, 2-[2-(2-methoxyethoxy)ethoxy]acetic acid (MEEAA), beta-carboxyethylacrylate, 2-(2-methoxyethoxy)acetic acid, methoxyphenyl acetic acid, and mixtures thereof. Further, a proprietary silane surface modifier, commercially available from OSI Specialties, Crompton South Charleston, W. Va. under the trade designation "Silquest A1230", has been found particularly suitable.

The surface modification of the particles in the colloidal dispersion can be accomplished in a variety of ways. The process involves the mixture of an inorganic dispersion with surface modifying agents. Optionally, a co-solvent can be added at this point, such as for example, 1-methoxy-2-propanol, ethanol, isopropanol, ethylene glycol, N,N-dimethylacetamide and 1-methyl-2-pyrrolidinone. The co-solvent can enhance the solubility of the surface modifying agents as well as the surface modified particles. The mixture comprising the inorganic sol and surface modifying agents is subsequently reacted at room or an elevated temperature, with or without mixing. In one method, the mixture can be reacted at about 85 degree C. for about 24 hours, resulting in the surface modified sol. In another method, where metal oxides are surface modified the surface treatment of the metal oxide can preferably involve the adsorption of acidic molecules to the particle surface. The surface modification of the heavy metal oxide preferably takes place at room temperature.

The surface modification of $ZrO_2$ with silanes can be accomplished under acidic conditions or basic conditions. In one case the silanes are heated under acid conditions for a suitable period of time. At which time the dispersion is combined with aqueous ammonia (or other base). This method allows removal of the acid counter ion from the $ZrO_2$ surface as well as reaction with the silane. In a one method the particles are precipitated from the dispersion and separated from the liquid phase.

A combination of surface modifying agents can be useful, wherein at least one of the agents has a functional group co-polymerizable with a hardenable resin. For example, the polymerizing group can be ethylenically unsaturated or a cyclic function subject to ring opening polymerization. An ethylenically unsaturated polymerizing group can be, for example, an acrylate or methacrylate, or vinyl group. A cyclic functional group subject to ring opening polymerization generally contains a heteroatom such as oxygen, sulfur or nitrogen, and preferably a 3-membered ring containing oxygen such as an epoxide.

A preferred combination of surface modifying agent includes at least one surface modifying agent having a functional group that is co-polymerizable with the (organic component of the) hardenable resin and a second modifying agent different than the first modifying agent. The second modifying agent is optionally co-polymerizable with the organic component of the polymerizable composition. The second modifying agent may have a low refractive index (i.e. less than 1.52 or less than 1.50). The second modifying agent is preferably a polyalkyleneoxide containing modifying agent that is optionally co-polymerizable with the organic component of the polymerizable composition.

The surface modified particles can then be incorporated into the curable resin in various methods. In a preferred aspect, a solvent exchange procedure is utilized whereby the resin is added to the surface modified sol, followed by removal of the water and co-solvent (if used) via evaporation, thus leaving the particles dispersed in the polyerizable resin. The evaporation step can be accomplished for example, via distillation, rotary evaporation or oven drying.

In another aspect, the surface modified particles can be extracted into a water immiscible solvent followed by solvent exchange, if so desired.

Alternatively, another method for incorporating the surface modified nanoparticles in the polymerizable resin involves the drying of the modified particles into a powder, followed by the addition of the resin material into which the particles are dispersed. The drying step in this method can be accomplished by conventional means suitable for the system, such as, for example, oven drying or spray drying.

The polymerizable compositions described herein can also contain one or more other useful additive as known in art including but not limited to surfactants, pigments, fillers, polymerization inhibitors, antioxidants, anti-static agents, and other possible ingredients.

The radiation curable articles of this invention may be prepared by simply blending the components thereof, with efficient mixing to produce a homogeneous mixture, and then removing any solvent employed in preparation of said components. Air bubbles can be removed by application of vacuum or the like, with gentle heating if the mixture is viscous, and casting or otherwise creating a film of the resulting blend on a desired surface. The film can then be charged to a mold bearing the microstructure to be replicated and polymerized by exposure to ultraviolet radiation, producing cured optical resinous articles of the invention having the aforementioned properties. If polymerized on a surface other than the one on which it is to be used, the optical resinous article can be transferred to another surface.

Such a polymerization process lends itself to rapid, mass production of articles with no adverse environmental impact because no or only a minor amount of solvent or other volatiles are evolved. The process also lends itself to replication of articles with microstructure comprising utilitarian discontinuities, such as projections and depressions, which are readily released from the mold without loss of the detail of the mold and with retention of the replication of such detail under a wide variety of conditions during use. The articles can be formed with a wide variety of desired properties, such as toughness, flexibility, optical clarity and homogeneity, and resistance to common solvents, the microstructure of such articles having high thermal dimensional stability, resistance to abrasion and impact, and integrity even when the articles are bent.

Suitable methods of polymerization include solution polymerization, suspension polymerization, emulsion polymerization, and bulk polymerization, as are known in the art. Suitable methods include heating in the presence of a free-radical initiator as well as irradiation with electromagnetic radiation such as ultraviolet or visible light in the presence of a photoinitiator. Inhibitors are frequently used in the synthesis of the polymerizable composition to prevent premature polymerization of the resin during synthesis, transportation and storage. Suitable inhibitors include hydroquinone, 4-methoxy phenol, and hindered amine nitroxide inhibitors at levels of 50-1000 ppm. Other kinds and/or amounts of inhibitors may be employed as known to those skilled in the art.

The radiation (e.g. UV) curable compositions comprise a least one photoinitiator. A single photoinitiator or blends thereof may be employed in the brightness enhancement film of the invention. In general the photoinitiator(s) are at least partially soluble (e.g. at the processing temperature of the resin) and substantially colorless after being polymerized. The photoinitiator may be (e.g. yellow) colored, provided that the photoinitiator is rendered substantially colorless after exposure to the UV light source.

Suitable photoinitiators include monoacylphosphine oxide and bisacylphosphine oxide. Commercially available mono or bisacylphosphine oxide photoinitiators include 2,4,6-trimethylbenzoydiphenylphosphine oxide, commercially available from BASF (Charlotte, N.C.) under the trade designation "Lucirin TPO"; ethyl-2,4,6-trimethylbenzoylphenyl phosphinate, also commercially available from BASF under the trade designation "Lucirin TPO-L"; and bis(2,4,6-trimethylbenzoyl)-phenylphosphine oxide commercially available from Ciba Specialty Chemicals under the trade designation "Irgacure 819". Other suitable photoinitiators include 2-hydroxy-2-methyl-1-phenyl-propan-1-one, commercially available from Ciba Specialty Chemicals under the trade designation "Darocur 1173" as well as other photoinitiators commercially available from Ciba Specialty Chemicals under the trade designations "Darocur 4265", "Irgacure 651", "Irgacure 1800", "Irgacure 369", "Irgacure 1700", and "Irgacure 907".

The photoinitiator can be used at a concentration of about 0.1 to about 10 weight percent. More preferably, the photoinitiator is used at a concentration of about 0.5 to about 5 wt-%. Greater than 5 wt-% is generally disadvantageous in view of the tendency to cause yellow discoloration of the brightness enhancing film. Other photoinitiators and photoinitiator may also suitably be employed as may be determined by one of ordinary skill in the art.

Surfactants such as fluorosurfactants and silicone based surfactants can optionally be included in the polymerizable composition to reduce surface tension, improve wetting, allow smoother coating and fewer defects of the coating, etc.

As described in Lu and Lu et al., a microstructure-bearing article (e.g. brightness enhancing film) can be prepared by a method including the steps of (a) preparing a polymerizable composition (i.e. the polymerizable composition of the invention); (b) depositing the polymerizable composition onto a master negative microstructured molding surface in an amount barely sufficient to fill the cavities of the master; (c) filling the cavities by moving a bead of the polymerizable composition between a preformed base and the master, at least one of which is flexible; and (d) curing the composition. The master can be metallic, such as nickel, nickel-plated copper or brass, or can be a thermoplastic material that is stable under the polymerization conditions, and that preferably has a surface energy that allows clean removal of the polymerized material from the master. One or more of the surfaces of the base film can be optionally be primed or otherwise be treated to promote adhesion of the optical layer to the base.

Composition that are too high in viscosity to be used in the process just described can optionally be prepared into brightness enhancing film with extrusion processes as are known in the art.

The optical layer can directly contact the base layer or be optically aligned to the base layer, and can be of a size, shape and thickness allowing the optical layer to direct or concentrate the flow of light. The optical layer can have a structured or micro-structured surface that can have any of a number of useful patterns such as described and shown in the FIGURES. The micro-structured surface can be a plurality of parallel longitudinal ridges extending along a length or width of the film. These ridges can be formed from a plurality of prism apexes. These apexes can be sharp, rounded or flattened or truncated. For example, the ridges can be rounded to a radius in a range of 4 to 7 to 15 micrometers.

These include regular or irregular prismatic patterns can be an annular prismatic pattern, a cube-corner pattern or any other lenticular microstructure. A useful microstructure is a regular prismatic pattern that can act as a totally internal reflecting film for use as a brightness enhancement film. Another useful microstructure is a corner-cube prismatic pattern that can act as a retro-reflecting film or element for use as reflecting film. Another useful microstructure is a prismatic pattern that can act as an optical element for use in an optical display. Another useful microstructure is a prismatic pattern that can act as an optical turning film or element for use in an optical display.

The base layer can be of a nature and composition suitable for use in an optical product, i.e. a product designed to control the flow of light. Almost any material can be used as a base material as long as the material is sufficiently optically clear and is structurally strong enough to be assembled into or used within a particular optical product. A base material can be chosen that has sufficient resistance to temperature and aging that performance of the optical product is not compromised over time.

The particular chemical composition and thickness of the base material for any optical product can depend on the requirements of the particular optical product that is being constructed. That is, balancing the needs for strength, clarity, temperature resistance, surface energy, adherence to the optical layer, among others.

Useful base materials include, for example, styrene-acrylonitrile, cellulose acetate butyrate, cellulose acetate propionate, cellulose triacetate, polyether sulfone, polymethyl methacrylate, polyurethane, polyester, polycarbonate, polyvinyl chloride, polystyrene, polyethylene naphthalate, copolymers or blends based on naphthalene dicarboxylic acids, polycyclo-olefins, polyimides, and glass. Optionally, the base material can contain mixtures or combinations of these materials. In an embodiment, the base may be multi-layered or may contain a dispersed phase suspended or dispersed in a continuous phase.

For some optical products such as microstructure-bearing products such as, for example, brightness enhancement films, examples of preferred base materials include polyethylene terephthalate (PET) and polycarbonate. Examples of useful PET films include photograde polyethylene terephthalate and MELINEX™ PET available from DuPont Films of Wilmington, Del.

Some base materials can be optically active, and can act as polarizing materials. A number of bases, also referred to herein as films or substrates, are known in the optical product art to be useful as polarizing materials. Polarization of light through a film can be accomplished, for example, by the inclusion of dichroic polarizers in a film material that selectively absorbs passing light. Light polarization can also be achieved by including inorganic materials such as aligned mica chips or by a discontinuous phase dispersed within a continuous film, such as droplets of light modulating liquid crystals dispersed within a continuous film. As an alternative, a film can be prepared from microfine layers of different materials. The polarizing materials within the film can be aligned into a polarizing orientation, for example, by employing methods such as stretching the film, applying electric or magnetic fields, and coating techniques.

Examples of polarizing films include those described in U.S. Pat. Nos. 5,825,543 and 5,783,120, each of which are incorporated herein by reference. The use of these polarizer films in combination with a brightness enhancement film has been described in U.S. Pat. No. 6,111,696, incorporated by reference herein.

A second example of a polarizing film that can be used as a base are those films described in U.S. Pat. No. 5,882,774, also incorporated herein by reference. Films available commercially are the multilayer films sold under the trade designation DBEF (Dual Brightness Enhancement Film) from 3M. The use of such multilayer polarizing optical film in a brightness enhancement film has been described in U.S. Pat. No. 5,828,488, incorporated herein by reference.

This list of base materials is not exclusive, and as will be appreciated by those of skill in the art, other polarizing and non-polarizing films can also be useful as the base for the optical products of the invention. These base materials can be combined with any number of other films including, for example, polarizing films to form multilayer structures. A short list of additional base materials can include those films described in U.S. Pat. Nos. 5,612,820 and 5,486,949, among others. The thickness of a particular base can also depend on the above-described requirements of the optical product.

Durable microstructure-bearing articles can be constructed in a variety of forms, including those having a series of alternating tips and grooves sufficient to produce a totally internal reflecting film. An example of such a film is a brightness enhancing film having a regular repeating pattern of symmetrical tips and grooves, while other examples have patterns in which the tips and grooves are not symmetrical. Examples of microstructure bearing articles useful as brightness enhancing films are described by U.S. Pat. Nos. 5,175,030 and 5,183,597, which are both incorporated herein by reference.

According to these patents, a microstructure-bearing article can be prepared by a method including the steps of (a) preparing a polymerizable composition; (b) depositing the polymerizable composition onto a master negative microstructured molding surface in an amount barely sufficient to fill the cavities of the master; (c) filling the cavities by moving a bead of the polymerizable composition between a preformed base and the master, at least one of which is flexible; and (d) curing the composition. The master can be metallic, such as nickel, nickel-plated copper or brass, or can be a thermoplastic material that is stable under polymerization conditions and that preferably has a surface energy that permits clean removal of the polymerized material from the master. The particular method used to create the microstructure topography described herein can be similar to the molding process described in U.S. Pat. No. 5,691,846 which is incorporated by reference herein. The microstructure article according to the invention can be formed from a continuous process at any desired length such as, for example, 5, 10, 100, 1000 meters or more.

The durable article can be used in applications needing durable micro-structured film including, for example, brightness enhancing films. The structure of these durable brightness enhancing films can include a wide variety of microstructured films such as, for example, U.S. Pat. Nos. 5,771,328, 5,917,664, 5,919,551, 6,280,063, and 6,356,391, all incorporated by reference herein.

A backlit liquid crystal display generally indicated at 10 in FIG. 1 includes a brightness enhancement film 11 of the present invention that can be positioned between a diffuser 12 and a liquid crystal display panel 14. The backlit liquid crystal display can also includes a light source 16 such as a fluorescent lamp, a light guide 18 for transporting light for reflection toward the liquid crystal display panel 14, and a white reflector 20 for reflecting light also toward the liquid crystal display panel. The brightness enhancement film 11 collimates light emitted from the light guide 18 thereby increasing the brightness of the liquid crystal display panel 14. The increased brightness enables a sharper image to be produced by the liquid crystal display panel and allows the power of the light source 16 to be reduced to produce a selected brightness. The brightness enhancement film 11 in the backlit liquid crystal display is useful in equipment such as computer displays (laptop displays and computer monitors), televisions, video recorders, mobile communication devices, handheld devices (i.e. cellphone, PDA), automobile and avionic instrument displays, and the like, represented by reference character 21.

The brightness enhancement film 11 includes an array of prisms typified by prisms 22, 24, 26, and 28, as illustrated in FIG. 2. Each prism, for example, such as prism 22, has a first facet 30 and a second facet 32. The prisms 22, 24, 26, and 28 can be formed on a body portion 34 that has a first surface 36 on which the prisms are formed and a second surface 38 that is substantially flat or planar and opposite the first surface.

A linear array of regular right prisms can provide both optical performance and ease of manufacture. By right prisms, it is meant that the apex angle $\theta$ is approximately 90°, but can also range from approximately 70° to 120° or from approximately 80° to 100°. The prism facets need not be identical, and the prisms may be tilted with respect to each other. Furthermore, the relationship between the thickness 40 of the film and the height 42 of the prisms is not critical, but it is desirable to use thinner films with well defined prism facets. The angle that the facets can form with the surface 38 if the facets were to be projected can be 45°. However, this angle would vary depending on the pitch of the facet or the angle $\theta$ of the apex.

FIGS. 3-9 illustrate representative embodiments of a construction for an optical element. It should be noted that these drawings are not to scale and that, in particular, the size of the structured surface is greatly exaggerated for illustrative purposes. The construction of the optical element can include combinations or two or more of the described embodiments below.

Figure 3:
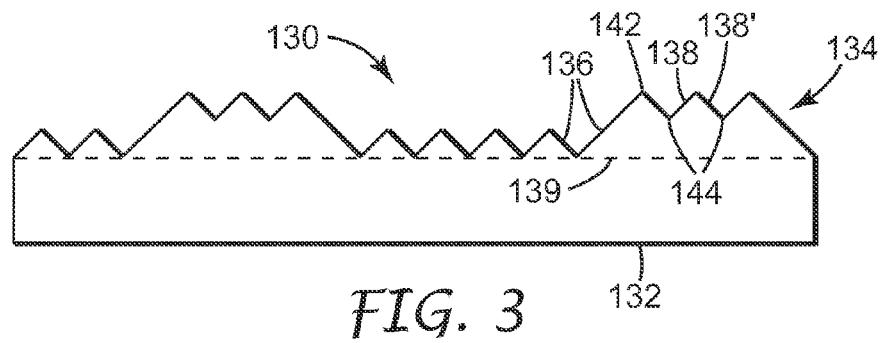
FIG. 3 is a cross-sectional view of an illustrative microstructured article that has prism elements of varying height.

Referring to FIG. 3, there is illustrated a representative cross-section of a portion of one embodiment of an optical element or light directing film. The film 130 includes a first surface 132 and an opposing structured surface 134 which includes a plurality of substantially linearly extending prism elements 136. Each prism element 136 has a first side surface 138 and a second side surface 138', the top edges of which intersect to define the peak, or apex 142 of the prism element 136. The bottom edges of side surfaces 138, 138' of adjacent prism elements 136 intersect to form a linearly extending groove 144 between prism elements. In the embodiment illustrated in FIG. 3, the dihedral angle defined by the prism apex 142 measures approximately 90 degrees, however it will be appreciated that the exact measure of the dihedral angle in this and other embodiments may be varied in accordance with desired optical parameters.

The structured surface 134 of film 130 may be described as having a plurality of alternating zones of prism elements having peaks which are spaced at different distances from a common reference plane. The common reference plane may be arbitrarily selected. One convenient example of a common reference plane is the plane which contains first surface 132; another is the plane defined by the bottom of the lower most grooves of the structured surface, indicated by dashed line 139. In the embodiment illustrated in FIG. 3, the shorter prism elements measure approximately 50 microns in width and approximately 25 microns in height, measured from dashed line 139, while the taller prism elements measure approximately 50 microns in width and approximately 26 microns in height. The width of the zone which includes the taller prism elements can measure between about 1 micron and 300 microns. The width of the zone that includes the shorter prism elements is not critical and can measures between 200 microns and 4000 microns. In any given embodiment the zone of shorter prism elements can be at least as wide as the zone of taller prism elements. It will be appreciated by one of ordinary skill in the art that the article depicted in FIG. 3 is merely exemplary and is not intended to limit the scope of the present invention. For example, the height or width of the prism elements may be changed within practicable limits—it is practicable to machine precise prisms in ranges extending from about 1 micron to about 200 microns. Additionally, the dihedral angles may be changed or the prism axis may be tilted to achieve a desired optical effect.

The width of the first zone can be less than about 200 to 300 microns. Under normal viewing conditions, the human eye has difficulty resolving small variations in the intensity of light that occur in regions less than about 200 to 300 microns in width. Thus, when the width of the first zone is reduced to less than about 200 to 300 microns, any optical coupling that may occur in this zone is not detectable to the human eye under normal viewing conditions.

A variable height structured surface may also be implemented by varying the height of one or more prism elements along its linear extent to create alternating zones which include portions of prism elements having peaks disposed at varying heights above a common reference plane.

Figure 4:
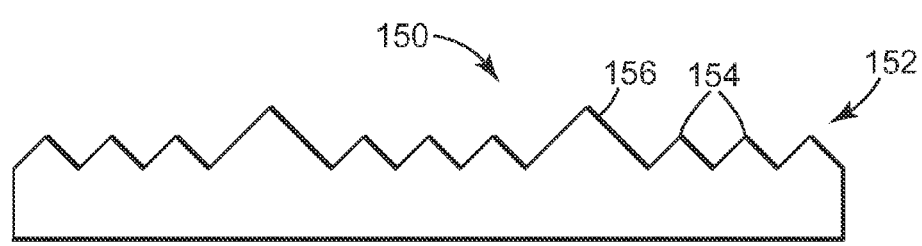
FIG. 4 is a cross-sectional view of an illustrative microstructured article that has prism elements of varying height.

FIG. 4 illustrates another embodiment of the optical element similar to FIG. 3 except that the film 150 includes a structured surface 152 which has a zone of relatively shorter prism elements 154 separated by a zone including a single taller prism element 156. Much like the embodiment depicted in FIG. 3, the taller prism element limits the physical proximity of a second sheet of film to structured surface 152, thereby reducing the likelihood of a visible wet-out condition. It has been determined that the human eye is sensitive to changes in facet heights in light directing films and that relatively wide zones of taller prism elements will appear as visible lines on the surface of a film. While this does not materially affect the optical performance of the film, the lines may be undesirable in certain commercial circumstances. Reducing the width of a zone of taller prism elements correspondingly reduces the ability of a human eye to detect the lines in the film caused by the taller prism elements.

Figure 5:
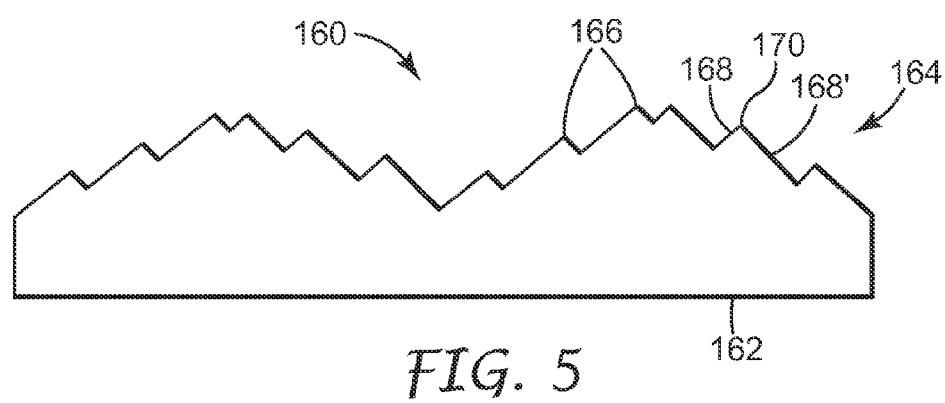
FIG. 5 is a cross-sectional view of an illustrative microstructured article.

FIG. 5 is a representative example of another embodiment of an optical element in which the prism elements are approximately the same size but are arranged in a repeating stair step or ramp pattern. The film 160 depicted in FIG. 5 includes a first surface 162 and an opposing structured surface 164 including a plurality of substantially linear prism elements 166. Each prism element has opposing lateral faces 168, 168' which intersect at their upper edge to define the prism peaks 170. The dihedral angle defined by opposing lateral faces 168, 168' measures approximately 90 degrees. In this embodiment the highest prisms may be considered a first zone and adjacent prisms may be considered a second zone. Again, the first zone can measure less than about 200 to 300 microns.

Figure 6:
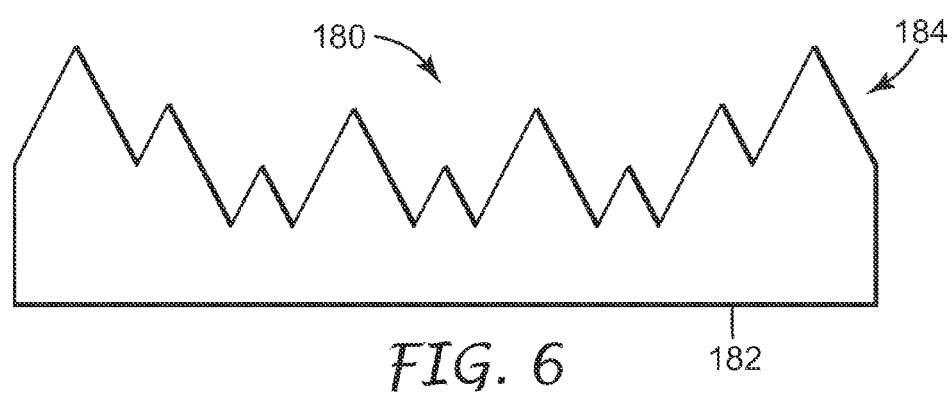
FIG. 6 is a cross-sectional view of an illustrative microstructured article in which the prism elements are of different heights and have their bases in different planes.

FIG. 6 illustrates a further embodiment of an optical element. The film 180 disclosed in FIG. 6 includes a first surface 182 and an opposing structured surface 184. This film may be characterized in that the second zone which includes relatively shorter prism elements contains prism elements of varying height. The structured surface depicted in FIG. 6 has the additional advantage of substantially reducing the visibility to the human eye of lines on the surface of the film caused by the variations in the height of the prism elements.

Figure 7:
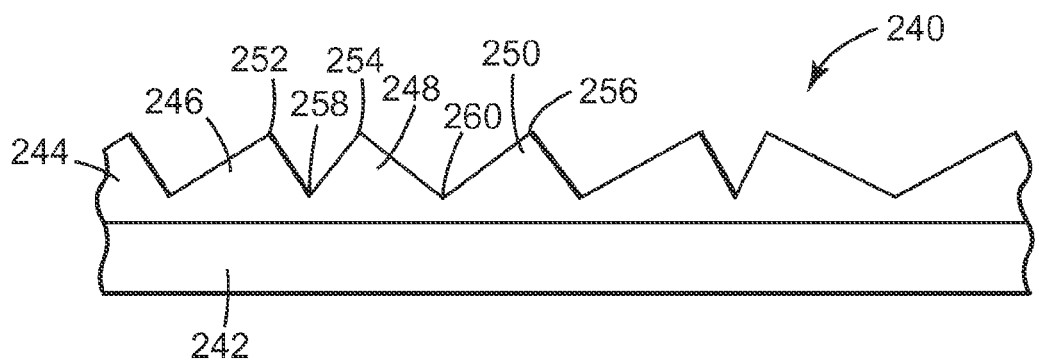
FIG. 7 is a cross-sectional view of an illustrative microstructured article.

FIG. 7 shows another embodiment of an optical element for providing a soft cutoff. FIG. 7 shows a brightness enhancement film, designated generally as 240, according to the invention. Brightness enhancement film 240 includes a substrate 242 and a structured surface material 244. Substrate 242 is can generally be a polyester material and structured surface material 244 can be an ultraviolet-cured acrylic or other polymeric material discussed herein. The exterior surface of substrate 242 is preferably flat, but could have structures as well. Furthermore, other alternative substrates could be used.

Structured surface material 244 has a plurality of prisms such as prisms 246, 248, and 250, formed thereon. Prisms 246, 248, and 250 have peaks 252, 254, and 256, respectively. All of peaks 252, 254, and 256 have peak or prism angles of preferably 90 degrees, although included angles in the range 60 degrees to 120 degrees. Between prisms 246 and 248 is a valley 258. Between prisms 248 and 250 is a valley 260. Valley 258 may be considered to have the valley associated with prism 246 and has a valley angle of 70 degrees and valley 260 may be considered the valley associated with prism 248 and has a valley angle of 110 degrees, although other values could be used. Effectively, brightness enhancement film 240 increases the apparent on axis brightness of a backlight by reflecting and recycling some of the light and refracting the remainder like prior art brightness enhancement film, but with the prisms canted in alternating directions. The effect of canting the prisms is to increase the size of the output light cone.

Figure 8:
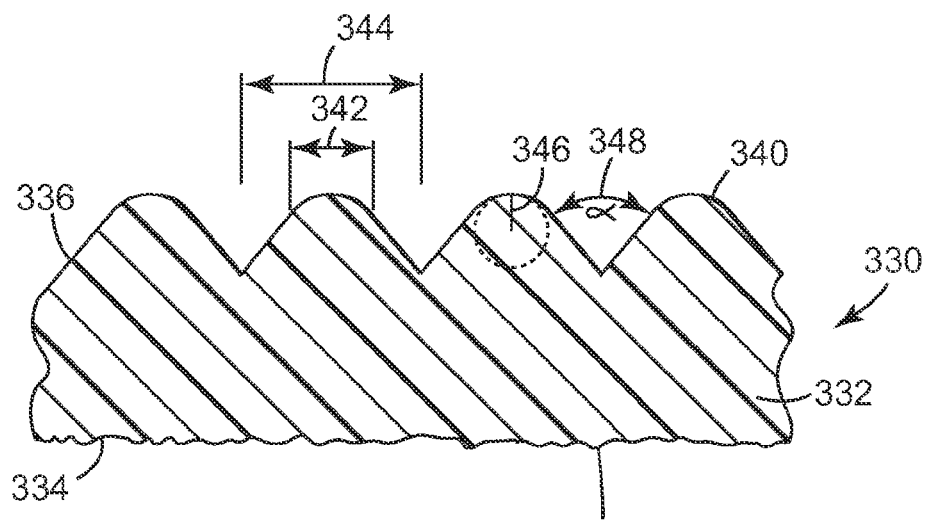
FIG. 8 is a cross-sectional view of an illustrative microstructured article.

FIG. 8 shows another embodiment of an optical element having rounded prism apexes. The brightness enhancement article 330 features a flexible, base layer 332 having a pair of opposed surfaces 334, 336, both of which are integrally formed with base layer 332. Surface 334 features a series of protruding light-diffusing elements 338. These elements may be in the form of "bumps" in the surface made of the same material as layer 332. Surface 336 features an array of linear prisms having blunted or rounded peaks 340 integrally formed with base layer 332. These peaks are characterized by a chord width 342, cross-sectional pitch width 344, radius of curvature 346, and root angle 348 in which the chord width is equal to about 20-40% of the cross-sectional pitch width and the radius of curvature is equal to about 20-50% of the cross-sectional pitch width. The root angle ranges from about 70-110 degrees, or from about 85-95 degrees, with root angles of about 90 degrees being preferred. The placement of the prisms within the array is selected to maximize the desired optical performance.

Rounded prism apex brightness enhancement articles usually suffer from decreased gain. However, the addition of high refractive index surface modified nanoparticles can offset the lost gain from the rounded prism apex brightness enhancement articles.

Figure 9:
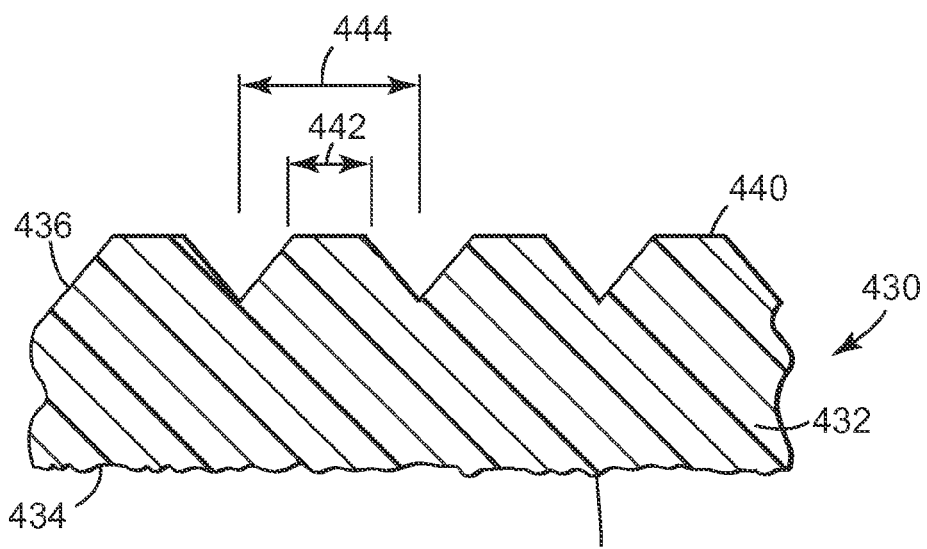
FIG. 9 is a cross-sectional view of an illustrative microstructured article.

FIG. 9 shows another embodiment of an optical element having flat or planar prism apexes. The brightness enhancement article 430 features a flexible, base layer 432 having a pair of opposed surfaces 434, 436, both of which are integrally formed with base layer 432. Surface 434 features a series of protruding light-diffusing elements 438. These elements may be in the form of "flat bumps" in the surface made of the same material as layer 432. Surface 436 features an array of linear prisms having flattened or planar peaks 440 integrally formed with base layer 432. These peaks are characterized by a flattened width 442 and cross-sectional pitch width 444, in which the flattened width can be equal to about 0-30% of the cross-sectional pitch width.

Another method of extracting light from a lightguide is by use of frustrated total internal reflection (TIR). In one type of frustrated TIR the lightguide has a wedge shape, and light rays incident on a thick edge of the lightguide are totally internally reflected until achieving critical angle relative to the top and bottom surfaces of the lightguide. These subcritical angle light rays are then extracted, or more succinctly refract from the lightguide, at a glancing angle to the output surface. To be useful for illuminating a display device, these light rays must then be turned substantially parallel to a viewing, or output, axis of the display device. This turning is usually accomplished using a turning lens or turning film.

Figure 10:
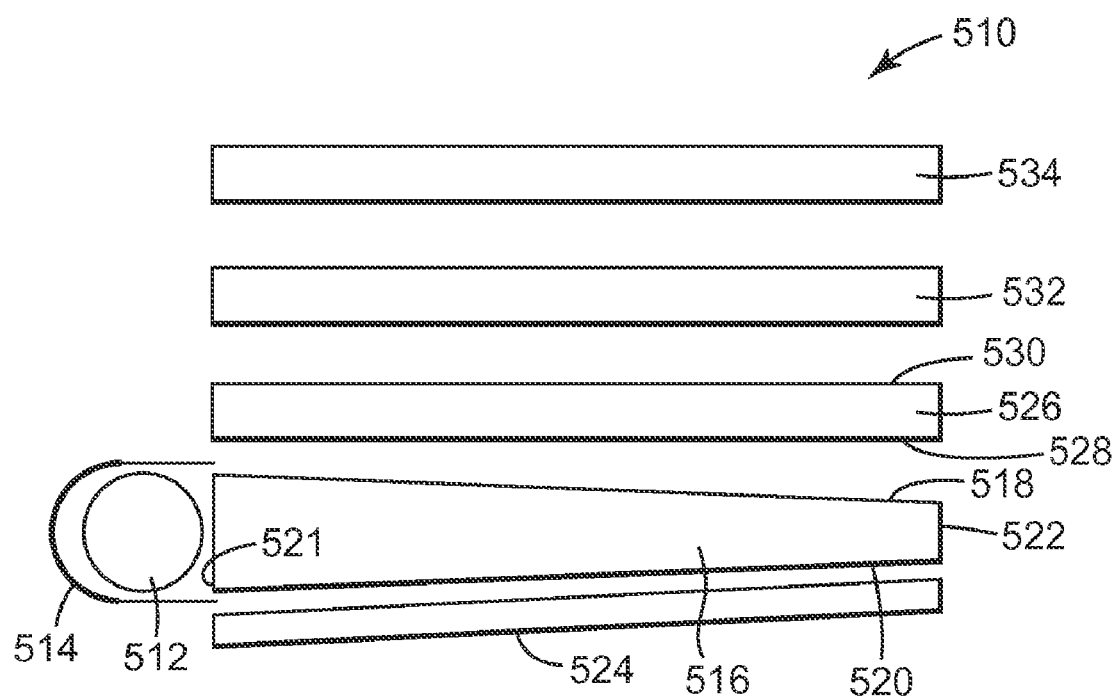
FIG. 10 is a schematic view of an illumination device including a turning film.
Figure 11:
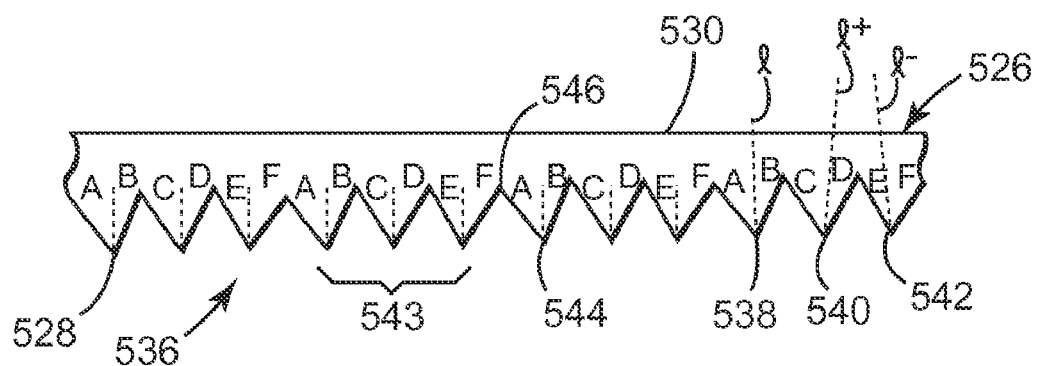
FIG. 11 is a cross-sectional view of a turning film.
Figure 12:
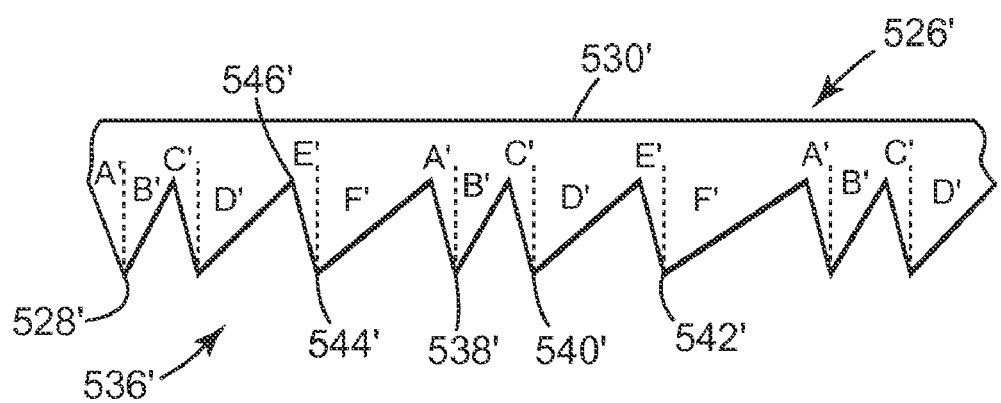
FIG. 12 is a cross-sectional view of another turning film.

FIGS. 10-12 illustrate an illumination device including a turning film. The turning film can include the inventive material disclosed herein for form a durable turning film. A turning lens or turning film typically includes prism structures formed on an input surface, and the input surface is disposed adjacent the lightguide. The light rays exiting the lightguide at the glancing angle, usually less than 30 degrees to the output surface, encounter the prism structures. The light rays are refracted by a first surface of the prism structures and are reflected by a second surface of the prism structures such that they are directed by the turning lens or film in the desired direction, e.g., substantially parallel to a viewing axis of the display. Turning films may have rounded apexes, having a radius for example of at least 0.5 micrometers and typically no greater than 10 micrometers.

Referring to FIG. 10, an illumination system 510 includes optically coupled a light source 512; a light source reflector 514; a lightguide 516 with an output surface 518, a back surface 520, an input surface 521 and an end surface 522; a reflector 524 adjacent the back surface 520; a first light redirecting element 526 with an input surface 528 and an output surface 530; a second light redirecting element 532; and a reflective polarizer 534. The lightguide 516 may be a wedge or a modification thereof. As is well known, the purpose of the lightguide is to provide for the uniform distribution of light from the light source 512 over an area much larger than the light source 512, and more particularly, substantially over an entire area formed by output surface 518. The lightguide 516 further preferably accomplishes these tasks in a compact, thin package.

The light source 512 may be a CCFL that is edge coupled to the input surface 521 of the lightguide 516, and the lamp reflector 514 may be a reflective film that wraps around the light source 512 forming a lamp cavity. The reflector 524 backs the lightguide 516 and may be an efficient back reflector, e.g., a lambertian or a specular film or a combination.

The edge-coupled light propagates from the input surface 521 toward the end surface 522, confined by TIR. The light is extracted from the lightguide 516 by frustration of the TIR. A ray confined within the lightguide 516 increases its angle of incidence relative to the plane of the top and bottom walls, due to the wedge angle, with each TIR bounce. Thus, the light eventually refracts out of each of the output surface 518 and the back surface 520 because it is no longer contained by TIR. The light refracting out of the back surface 520 is either specularly or diffusely reflected by the reflector 524 back toward and largely through the lightguide 516. The first light redirecting element 526 is arranged to redirect the light rays exiting the output surface 518 along a direction substantially parallel to a preferred viewing direction. The preferred viewing direction may be normal to the output surface 518, but will more typically be at some angle to the output surface 518.

As shown in FIG. 11, the first light redirecting element 526 is a light transmissive optical film where the output surface 530 is substantially planar and the input surface 528 is formed with an array 536 of prisms 538, 540 and 542. The second light redirecting element 532 may also be a light transmissive film, for example a brightness enhancing film such as the 3M Brightness Enhancement Film product (sold as BEFIII) available from Minnesota Mining and Manufacturing Company, St. Paul, Minn. The reflective polarizer 534 may be an inorganic, polymeric, cholesteric liquid crystal reflective polarizer or film. A suitable film is the 3M Diffuse Reflective Polarizer film product (sold as DRPF) or the Specular Reflective Polarizer film product (sold as DBEF), both of which are available from Minnesota Mining and Manufacturing Company.

Within array 536, each prism 538, 540 and 542 may be formed with differing side angles as compared to its respective neighbor prisms. That is, prism 540 may be formed with different side angles (angles C and D) than prism 538 (angles A and B), and prism 542 (angles E and F). As shown, prisms 538 have a prism angle, i.e., the included angle, equal to the sum of the angles A and B. Similarly, prisms 540 have a prism angle equal to the sum of the angles C and D, while prisms 542 have a prism angle equal to the sum of the angles E and F. While array 536 is shown to include three different prism structures based upon different prism angle, it should be appreciated that virtually any number of different prisms may be used.

Prisms 538, 540 and 542 may also be formed with a common prism angle but with a varied prism orientation. A prism axis "l" is illustrated in FIG. 11 for prism 538. The prism axis l may be arranged normal to the output surface 530, as shown for prism 538, or at an angle to the output surface either toward or away from the light source as illustrated by phantom axes "l+" and "l−", respectively, for prisms 540 and 542.

Prisms 538, 540 and 542 may be arranged within array 536 as shown in FIG. 11 in a regular repeating pattern or clusters 543 of prisms, and while the array 536 is not shown to have like prisms adjacent like prisms, such a configuration may also be used. Moreover, within the array 536, the prisms 538, 540 and 542 may change continuously from a first prism configuration, such as prism configuration 538, to a second prism configuration, such as prism configuration 540, and so on. For example, the prism configuration may change in a gradient manner from the first prism configuration to the second prism configuration. Alternatively, the prisms may change in a step-wise manner, similar to the configuration shown in FIG. 11. Within each cluster 543, the prisms have a prism pitch, which is selected to be smaller than the spatial ripple frequency. Likewise, the clusters may have a regular cluster pitch. The prism array can be symmetrical as shown in FIG. 11 or the prism array can be non-symmetrical.

While the array 536 shown in FIG. 11 has prisms having a symmetric configuration, an array of prisms, such as array 536' shown in FIG. 12 formed in light redirecting element 526', may be used. Referring then to FIG. 12, in the array 536', prisms 538', for example, has angle A' unequal to angle B'. Similarly for prisms 540' and 542', angle C' is unequal to angle A' and angle D', and angle E' is unequal to either of angle A', angle C' or angle F'. The array 536' may be advantageously formed using a single diamond cutting tool of a predetermined angle, and tilting the tool for each cut producing prisms of differing prism angle and symmetry. However, it will be appreciated that with the use of a single cutting tool, the prism angles will be the same, i.e., A+B=C+D=E+F.

It is contemplated that as few as two different prism configurations may be used and arranged in clusters within the array 536, although as many prism sizes as necessary to accomplish a modification of the output profile from the lightguide 516 may be used. One purpose of the prism side angle variation is to spread and add variable amounts of optical power into the first light redirecting element 526. The varying configuration of prisms 538, 540 and 542 serves to provide substantially uniform sampling of the input aperture of the lightguide, which minimizes non-uniformities in the light extracted from the lightguide 516. The net result is an effective minimization of the ripple effect particularly near the entrance end 521 of the lightguide 516.

The present invention should not be considered limited to the particular examples described herein, but rather should be understood to cover all aspects of the invention as fairly set out in the attached claims. Various modifications, equivalent processes, as well as numerous structures to which the present invention can be applicable will be readily apparent to those of skill in the art to which the present invention is directed upon review of the instant specification.

All proportions shown in the examples are percent by weight unless otherwise specified.

EXAMPLE 1

Oligomeric Urethane (meth)acrylate

To a 3-necked flask equipped with an addition funnel, temperature probe and mechanical stirrer was charged with 31.2 ml of 2,2,4-trimethylhexane 1,6-diisocyanate and 50 mg of dibutyltin dilaurate. The addition funnel was charged with 39.75 g of warm polycaprolactone diol (Mn. 530), which then was added to the contents of the flask at 55-60° C. The mixture was stirred at 65 C. for 14 hours. The flask was then cooled to 55° C. and a mixture of 18.7 ml of 2-hydroxyethyl methacrylate and 100 mg hydroquinone monomethyl ether was added while maintaining the temperature in the range of 54-58° C. The mixture was stirred at 55° C. for 10-12 hours until completion of the reaction yields an oligomeric urethane dimethacrylate, that was verified by infrared spectroscopy.

EXAMPLE 2

Colloidal Silica Dispersion

Nalco 2327 (400.00 g) was charged to a 1 liter Ehrlenmeyer flask. 1-Methoxy-2-propanol (450.0 g), Silane A174 (18.54 g), and PEG2TES (9.11 g) were mixed together and added to the colloidal dispersion while stirring. The contents of the flask were poured into three 32 oz sealed jars. The jars were heated at 80° C. for 16 hours. This resulted in a clear, low viscosity dispersion of surface modified colloidal silica nanoparticles "colloidal silica" (20.8% solids)

"PEG2TES" refers to N-(3-triethoxysilylpropyl) methoxyethoxyethyl carbamate. It was prepared as follows: A 250 ml round-bottomed flask equipped with a magnetic stir bar was charged with 35 g diethylene glycol methyl ether and 77 g methyl ethyl ketone followed by rotary evaporation of a substantial portion of the solvent mix to remove water. 3-(Triethoxysilyl)propylisocyanate (68.60 g) was charged to the flask. Dibutyltin dilaurate (approx. 3 mg) was added and the mixture stirred. The reaction proceeded with a mild exotherm. The reaction was run for approximately 16 hr at which time infrared spectroscopy showed no isocyanate. The remainder of the solvent and alcohol were removed via rotary evaporation at 90° C. to yield 104.46 g PEG2TES as a somewhat viscous fluid.

EXAMPLES 3-14

A mixture of 49.5 parts of an oligomeric polyester urethane diacrylate commercially available under the trade designation "CN-985B88" from Sartomer Co. and appropriate amounts of Example 2 can be combined to provide polymerizable compositions having, 5 wt-% silica (Example 3), 10 wt-% silica (Example 4), 15 wt-% silica (Example 5), 20 wt-% silica (Example 6), and 25 wt-% silica (Example 7), 30 wt-% silica (Example 8), 35 wt-% silica (Example 9), 40 wt-% silica (Example 10), 45 wt-% silica (Example 11), 50 wt-% silica (Example 12), 55 wt-% silica (Example 13) and 60 wt-% silica (Example 14). The polymerizable silica-containing compositions can be vacuum stripped and 0.5 part of "Darocur 4265" (in the form of a 10% solution in 1-methoxy-2-propanol) can be added. The resulting composition can be spin coated from 1-methoxy-2-propanol on a bisphenol A polycarbonate plaque and cured by exposure to ultraviolet radiation emitted by a single "H" bulb.

EXAMPLES 15-21

Various compositions can be prepared in propylene glycol methyl ether acetate from appropriate amounts of the oligomer dimethacrylate of Example 1, the silica nanoparticle dispersion of Example 2, "Darocur 4265" (0.5%) as photoinitiator, and hexanediol diacrylate ("HDDA"). Upon removal of the solvent and water the compositions would result in the amounts indicated in the following Table I.

TABLE I

| | Example | | | | | | |
|---|---|---|---|---|---|---|---|
| | 15 | 16 | 17 | 18 | 19 | 20 | 21 |
| HDDA wt-% | 0 | 67.5 | 45 | 0 | 12.5 | 0 | 6.25 |
| Ex. 1 wt-% | 90 | 22.5 | 45 | 50 | 37.5 | 25 | 18.75 |
| Ex. 2 wt-% | 10 | 10 | 10 | 50 | 50 | 75 | 75 |

EXAMPLE 17

Example 17 was Prepared as Follows

To a 500 ml flask, 23.70 g of oligomer diacrylate from Ex. 1, 4.1 g of HDDA, 20 g of methoxypropanol, and 71 g of the colloidal silica of Ex. 2. The solvent and water were removed via rotary evaporation. 5.001 g of the resulting material, 7.37 g of HDDA, 5.07 g of oligomer diacrylate from Ex. 1, and 0.151 g of TPO-L were added to a 30 ml vial.

The polymerizable composition of Example 17 was prepared into microstructured brightness enhancing film similar to those described in U.S. Pat. Nos. 5,175,030 and 5,183,597 or co-assigned U.S. Pat. Nos. 7,041,365, and 7,074,463.

The micro-prismatic structures had a 90° apex angle as defined by the slope of the sides of the prisms with the mean distance between adjacent apices being about 50 micrometers. The prism vertices or apexes were sharp and the prismatic pattern was similar to that commercially available from 3M Co. as Vikuity BEF III 90/50.

The gain of the resulting microstructured brightness enhancing film was measured on a SpectraScan™ PR-650 SpectraColorimeter available from Photo Research, Inc, Chatsworth, Calif. In order to measure the single sheet gain, film samples were cut and placed on a Teflon light cube that is illuminated via a light-pipe using a Foster DCR II light source such that the grooves of the prisms are parallel to the front face of the Teflon light cube. The single sheet gain of the film produced from the polymerizable composition of Example 17 was 1.524.

EXAMPLES 22-24

Examples 22-34 of following Table II are additional oligomeric urethane (meth) acrylate based compositions that were prepared. Example 35 and 36 exemplify additional suitable formulations that can be prepared.

Each of the oligomeric urethane (meth)acrylate compositions of Examples 22-34 can be combined with appropriate amounts of the silica dispersion of Example 2 to provide polymerizable compositions having, 5 wt-% silica, 10 wt-% silica, 15 wt-% silica, 20 wt-% silica, and 25 wt-% silica, 30 wt-% silica, 35 wt-% silica, 40 wt-% silica, 45 wt-% silica, 50 wt-% silica, 55 wt-% silica and 60 wt-% silica. From 5 wt-% to 30 wt-% of reactive diluents such as tetrahydrofurfuryl acrylate(THFA), phenoxy ethyl acrylate and isobornyl acrylate (IBOA) can be added to any of the silica containing oligomeric urethane (meth)acrylate compositions, particularly to reduce the viscosity such that the composition is suitable for the method previously described in Lu and Lu et al.

The described polymerizable compositions (i.e. having a suitable viscosity) can be prepared into microstructured brightness enhancing film similar to those described in U.S. Pat. Nos. 5,175,030 and 5,183,597 or co-assigned U.S. Pat. Nos. 7,041,365, and 7,074,463, and are incorporated by reference herein.

The micro-prismatic structures can have a 90° apex angle as defined by the slope of the sides of the prisms with the mean distance between adjacent apices being about 50 micrometers. The prism vertices or apexes can have a 7 micron radius rounding or the apexes can be sharp and have a prismatic pattern similar to that of brightness enhancing film commercially available from 3M Company under the trade designation "Vikuity BEF III 90/50".

The resulting microstructured brightness enhancing film can be evaluated according to the Scratch Contrast Ratio as previously described.

The gain of the resulting microstructured brightness enhancing film can be measured according to the test method described with reference to Example 17.

TABLE II

| Ex. | Wt. % | Oligomer | Supplier | Wt. % | X-linker | X-linker | pph | Photoinitiator |
|---|---|---|---|---|---|---|---|---|
| 22 | 40 | Photomer 6010 | Cognis | 60 | SR-351 | TMPTA | 0.5 | Lucirin TPO-L |
| 23 | 47 | Photomer 6010 | Cognis | 53 | SR-351 | TMPTA | 1 | Lucirin TPO-L |
| 24 | 35 | Photomer 6010 | Cognis | 65 | SR-351 | TMPTA | 1 | Lucirin TPO-L |
| 25 | 25 | Photomer 6010 | Cognis | 75 | SR-351 | TMPTA | 1 | Lucirin TPO-L |
| 26 | 48 | Photomer 6010 | Cognis | 52 | SR-444 | PETA | 0.5 | Lucirin TPO-L |
| 27 | 50 | Photomer 6010 | Cognis | 50 | SR-355 | di-TMPTA | 0.5 | Lucirin TPO-L |
| 28 | 40 | Photomer 6010 | Cognis | 60 | SR-355 | di-TMPTA | 0.5 | Lucirin TPO-L |
| 29 | 45 | Photomer 6010 | Cognis | 55 | SR-355 | di-TMPTA | 0.5 | Lucirin TPO-L |
| 30 | 85 | Photomer 6210 | Cognis | 15 | SR-351 | TMPTA | 1 | Lucirin TPO-L |
| 31 | 87 | Ebecryl 8402 | Surface Specialties | 13 | SR-351 | TMPTA | 1 | Lucirin TPO-L |
| 32 | 57 | Ebecryl 8807 | Surface Specialties | 43 | SR-351 | TMPTA | 1 | Lucirin TPO-L |
| 33 | 100 | CN 966B85* | Sartomer | | | | 1 | Lucirin TPO-L |
| 34 | 40 | CN 964 | Sartomer | 60 | SR-351 | TMPTA | 1 | Lucirin TPO-L |
| 35 | 50 | CN 972 | Sartomer | 50 | SR-351 | TMPTA | 1 | Lucirin TPO-L |
| 36 | 50 | Ebecryl 4827 | Surface Specialties | 50 | HDODA | HDDA | 1 | Lucirin TPO-L |

*CN966 blended with 15% hexanediol diacrylate (HDDA)

What is claimed is:

1. A microstructured article comprising a polymerized structure comprising the reaction product of a composition comprising an organic component having at least one aliphatic oligomeric urethane (meth)acrylate and surface modified silica nanoparticles having a primary particle size greater than 1 nm and less than 100 nm.

2. The microstructured article according to claim 1 wherein the silica nanoparticles have a primary particle size is from 5 to 75 nm.

3. The microstructured article according to claim 1 wherein the silica nanoparticles have a primary particle size ranging from 10 to 30 nm.

4. The microstructured article according to claim 1 wherein the silica comprises 10 to 60 wt-% of the polymerized structure.

5. The microstructured article according to claim 1 wherein the silica comprises 10 to 40 wt-% of the polymerized structure.

6. The microstructured article according to claim 1 wherein the composition further comprise nanoparticles selected from zirconia, titania, antimony oxides, alumina, tin oxides, mixed metal oxides thereof, or mixtures thereof.

7. The microstructured article according to claim 1 wherein the surface modified nanoparticles are polymerizable with the organic component.

8. The microstructured article according to claim 1 wherein the composition comprises a photoinitiator.

9. The microstructured article of claim 1 wherein the article is retroreflective sheeting.

10. The microstructured article of claim 1 wherein the article is a flexible mold suitable for making baffler ribs for a plasma display panel.

11. The microstructured article of claim 1 wherein the article is an optical film comprising a microstructured optical layer in contact with a base layer.

12. The microstructured article of claim 11 wherein the article microstructured optical layer comprises a plurality of ridges having apexes.

13. The microstructured article of claim 12 wherein the apexes are rounded having a radius ranging from 4 to 15 micrometers.

14. The microstructured article of claim 13 wherein the article is a turning film.

15. A device comprising:
   (a) a lighting device having a light-emitting surface; and
   (b) the microstructured film of claim 11 placed substantially parallel to said light-emitting surface.

16. The device according to claim 15 wherein the lighting device is a back-lit display device or a liquid crystal display device.

17. The device according to claim 15 wherein the device is selected from a handheld device, a computer display and a television.

18. The microstructure article of claim 8 wherein the composition is polymerized by exposure to ultraviolet radiation.

* * * * *

UNITED STATES PATENT AND TRADEMARK OFFICE
CERTIFICATE OF CORRECTION

PATENT NO.        : 7,427,438 B2
APPLICATION NO.   : 11/950798
DATED             : September 23, 2008
INVENTOR(S)       : Clinton L. Jones It is certified that error appears in the above-identified patent and that said Letters Patent is hereby corrected as shown below:

On the Title Page, Item (56), Page 2, column 2 (foreign patent documents)
Line 9, Delete "WO 00/00594" and insert -- WO 02/00594 --, therefor.

Column 6
Line 18, Delete "butylcarbamyl)ethyl(meth)acrylates" and insert
-- butylcarbamoyl)ethyl(meth)acrylates --, therefor.
Line 38, Delete "di(trimethylolpropane)tetraacrylate" and insert
-- di(trimethylolpropane) tetraacrylate --, therefor.
Line 59, Delete "miscroscopy" and insert -- microscopy --, therefor.
Line 62, Delete "collidal" and insert -- colloidal --, therefor.

Column 7
Line 52, Delete "phosphohonic" and insert -- phosphonic --, therefor.

Column 9
Line 23, Delete "polyerizable" and insert -- polymerizable --, therefor.

Column 18
Line 63, Delete "Ehrlenmeyer" and insert -- Erlenmeyer --, therefor.

Column 19
Line 3, After "solids)" insert -- . --.

Column 20
Line 14, Delete "Vikuity" and insert -- Vikuiti --, therefor.
Line 61, Delete "Vikuity" and insert -- Vikuiti --, therefor.

UNITED STATES PATENT AND TRADEMARK OFFICE
CERTIFICATE OF CORRECTION

PATENT NO. : 7,427,438 B2
APPLICATION NO. : 11/950798
DATED : September 23, 2008
INVENTOR(S) : Clinton L. Jones It is certified that error appears in the above-identified patent and that said Letters Patent is hereby corrected as shown below:

Column 22
Line 33, In Claim 10, delete "baffler" and insert -- barrier --, therefor.

Signed and Sealed this

Second Day of December, 2008

JON W. DUDAS
*Director of the United States Patent and Trademark Office*